No. 612,803. Patented Oct. 18, 1898.
M. EPSTEIN.
PASTRY BAKING PAN.
(Application filed July 26, 1897.)
(No Model.)
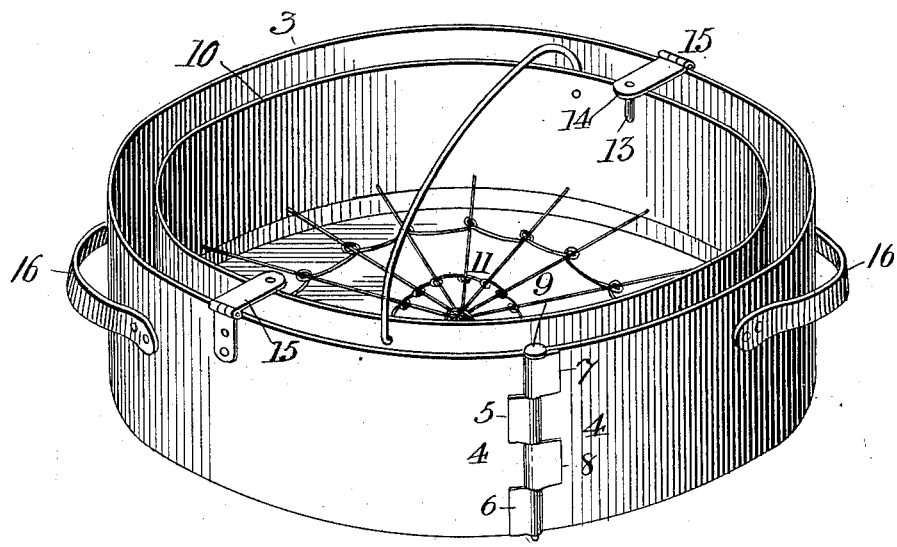
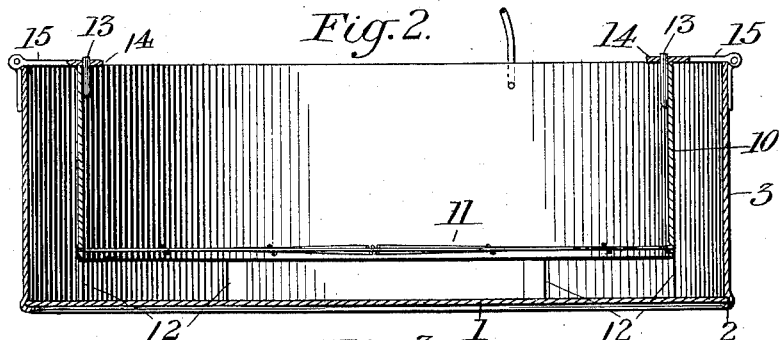
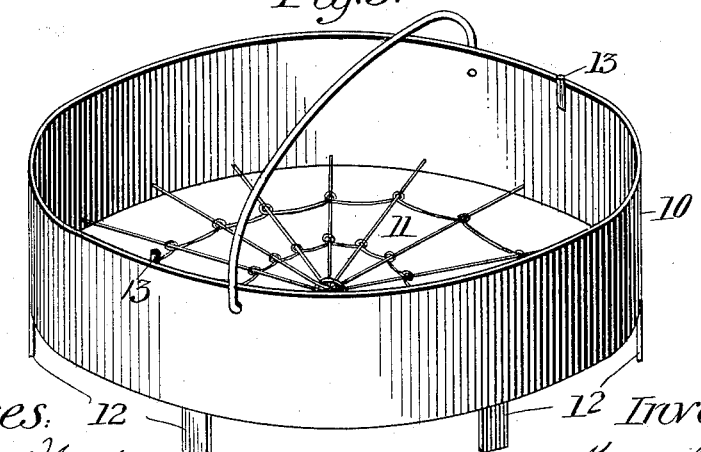
Witnesses: Inventor:

UNITED STATES PATENT OFFICE.

MINA EPSTEIN, OF BOISE, IDAHO.

PASTRY-BAKING PAN.

SPECIFICATION forming part of Letters Patent No. 612,803, dated October 18, 1898.

Application filed July 26, 1897. Serial No. 646,061. (No model.)

*To all whom it may concern:*

Be it known that I, MINA EPSTEIN, a citizen of the United States, residing at Boise city, in the county of Ada and State of Idaho, have invented certain new and useful Improvements in Pastry-Baking Pans; and I do hereby declare the following to be a full, clear, and exact description of the invention, such as will enable others skilled in the art to which it appertains to make and use the same.

My invention relates to pans for baking cake, pastry, &c.; and its object is to provide a pan adapted for baking cake having a casing or shell to contain a filling of fruit or other material and at the same time to provide a pan of the character above described with means for baking an independent flat cake or layer adapted to serve as a top or cover for the hollow of the shell-like cake or casing after the latter has been filled.

At present a filled cake is first made by baking a solid cake and then cutting out and removing the material from the center. Such a process involves extra labor and the loss of all the material removed from the center of the solid cake in which to insert the filling of fruit or other substance. At present the top of the filled cake is baked separately and placed over and made a cover to the hollow center of the filled cake to complete it.

By my invention described below I provide a combination by which the shell and cover to the filled cake can both be baked at the same time and in the same pan and at the same time save much extra labor and material.

A practical embodiment of my invention is illustrated in the accompanying drawings, in which—

Figure 1 is a view in perspective of the improved pan. Fig. 2 is a central vertical section of the same, and Fig. 3 is a view of the inner section of the pan removed.

The pan comprises an inner and outer vessel. The outer vessel comprises the bottom 1, preferably formed with a beaded peripheral edge 2. The sides 3 are formed from a band or strip of metal bent to the required form to engage the bottom 1 and having its ends 4 detachably connected together by any suitable means. I have shown as one form of securing device for the meeting ends of the band a hinge, the respective leaves 5 and 6 of which are secured one to each end of the band, so that their perforated ears 7 and 8 will aline to receive the removable securing-pin 9.

The inner vessel of the pan comprises sides 10 and a bottom 11, secured thereto. The lower edge of the sides is provided with feet 12 to support the inner vessel above the bottom 1 of the outer vessel, and at diametrically opposite points on the top edge of the band 10 I provide catches 13 to engage the free ends 14 of arms or braces 15, pivotally secured to the upper edge of the band 3 of the outer vessel. The ends 14 are perforated to take over the catches 13. As shown in Figs. 1 and 3, the bottom of the inner vessel is a skeleton one, being preferably made of wire in the form of a spider's web, with arms radiating from the center and annular wires connecting the arms.

The two handles 16 are secured to the sides of the outer vessel to facilitate the handling thereof, and the inner vessel has a bail to facilitate its insertion and removal.

The inner vessel 10 is placed within the outer vessel and is centered and secured therein by means of the braces or arms 15, which are pivoted to the sides of the outer vessel and engage the catches 13.

The pan may be filled either by pouring the dough into the space between the vessels and allowing it to rise through the skeleton bottom of the inner vessel, or it may simply be poured into the outer vessel before the inner one is put in place and the latter then set in upon the dough in the ordinary way. In either case the dough will rise through the skeleton bottom of the inner pan in the process of baking, though not ordinarily to the height of that in the annular space between the side walls of the two vessels. It will be apparent that the baked contents will conform to the shape of the spaces containing them and that the cake between the two vessels will consist of a flat base and vertical rim forming a shell or casing to contain any desired filling of fruit or the like. The cake contained within the inner vessel will consist of a flat layer of less thickness than the height of the outer rim and adapted to serve as a cover for the filled casing or shell. After removing the pan from the oven the pivoted braces or arms 15 are disconnected from the catches 13 to permit the inner vessel to be lifted out of the outer section. This will separate the cake in the vessel from that under it, and the baked layer may then be removed from the inner vessel. The skeleton bottom 11 not only allows the dough to rise into the inner vessel, but facilitates the separation of that part of the cake which is baked in the inner vessel from that part contained in the outer one.

To remove the contents of the outer vessel, it is only necessary to remove the pin 9, connecting the ends of the band 3, forming the sides, thus permitting the removal of the sides from the bottom 1. The cake may then be readily freed from the pan.

While I have shown the pan of circular or cylindrical form, it is obvious that it may be made of square or any other desired shape or size.

Having thus described my invention, what I claim is—

1. In a baking-pan, the combination of an outer vessel, and a removable inner vessel, the latter having a skeleton bottom and being supported so as to leave an intervening space between it and the outer vessel at the bottom and sides, the space within and around the inner vessel being adapted to receive the dough to be baked.

2. In a baking-pan, the combination of an outer vessel, having a bottom and removable sides, and a removable inner vessel, the latter having a skeleton bottom and being supported so as to leave an intervening space between it and the outer vessel at the sides and bottom, said inner vessel and the intervening space being adapted to receive the dough to be baked.

3. In a baking-pan, the combination of an outer vessel, a removable inner vessel having feet to support it above the bottom of the outer vessel, and devices for centering it within the outer vessel so as to leave an intervening space between the two at the sides, said inner vessel having a skeleton bottom, and it and the space around it being adapted to receive the dough to be baked.

4. In a baking-pan, the combination of an outer vessel having a bottom and removable sides, said sides consisting of a band provided with a groove near its lower edge to receive the bottom, and having its ends detachably connected together, a removable inner vessel having a skeleton bottom and feet to support it above the bottom of the outer vessel, and centering devices permanently attached to one of said vessels at the sides and adapted to engage the other.

In testimony whereof I affix my signature in the presence of two witnesses.

MINA EPSTEIN.

Witnesses:
FREMONT WOOD,
NELLIE T. WOOD.